United States Patent
Ratakonda et al.

(10) Patent No.: US 8,156,364 B2
(45) Date of Patent: Apr. 10, 2012

(54) SYNCHRONIZED PARALLEL PROCESSING OF ROWS OF DATA WITH DEPENDENCIES BY DETERMINING START TIME FOR PROCESSORS

(75) Inventors: Krishna Ratakonda, Yorktown Heights, NY (US); Deepak S. Turaga, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 1337 days.

(21) Appl. No.: 11/761,510

(22) Filed: Jun. 12, 2007

(65) Prior Publication Data

US 2008/0313484 A1 Dec. 18, 2008

(51) Int. Cl.
*G06F 1/12* (2006.01)
(52) U.S. Cl. ............................ 713/375; 345/505; 712/17
(58) Field of Classification Search ........................ None
See application file for complete search history.

(56) References Cited

U.S. PATENT DOCUMENTS

| | | | |
|---|---|---|---|
| 5,010,515 A | 4/1991 | Torborg, Jr. | |
| 5,510,842 A | 4/1996 | Phillips et al. | |
| 6,477,281 B2 | 11/2002 | Mita et al. | |
| 2003/0189982 A1* | 10/2003 | MacInnis | 375/240.24 |

\* cited by examiner

*Primary Examiner* — Kenneth Kim
(74) *Attorney, Agent, or Firm* — Ryan, Mason & Lewis, LLP

(57) ABSTRACT

A method (which can be computer implemented) for processing a plurality of adjacent rows of data units, using a plurality of parallel processors, given (i) a predetermined processing order, and (ii) a specified inter-row dependency structure, includes the steps of determining starting times for each individual one of the processors, and maintaining synchronization across the processors, while ensuring that the dependency structure is not violated. Not all the starting times are the same, and a sum of absolute differences between (i) starting times of any given processor, and (ii) that one of the processors having an earliest starting time, is minimized.

20 Claims, 5 Drawing Sheets

1  Set $P_{R_0}^{min} = P_{R_0} = 0$ 2  for k = 1 to N-1
   Derive $P_{R_k}^{min}$ 3  Determine the right-most processor as $O_0 = \arg\max_{j=0,1,\ldots N-1} (P_{R_j}^{min})$  Set $P_{O_0} = \max_{j=0,1,\ldots N-1} (P_{R_j}^{min})$ 4  Set $P_{R_{N-1}}^{max} = P_{R_{N-1}} = P_{O_0}$ 5  for k = N-2 to 0
   Determine $P_{R_k}^{max}$
   Set $P_{R_k} = \max(P_{R_k}^{max}, P_{R_k}^{min}, P_{O_0})$
   Set $P_{R_k}^{max} = P_{R_k}$ 6  Determine the left-most processor as $O_{N-1} = \arg\min_{j=0,1,\ldots N-1}(P_{R_j}^{max})$

SYNCHRONIZED PARALLEL PROCESSING OF ROWS OF DATA WITH DEPENDENCIES BY DETERMINING START TIME FOR PROCESSORS

FIELD OF THE INVENTION

The present invention relates to the electrical, electronic, and computer arts, and, more particularly, to parallel processing of data.

BACKGROUND OF THE INVENTION

Multi-dimensional data processing involves a series of operations on data units, such as blocks of data, which are being processed in some pre-set order. For the purposes of describing prior techniques, and exemplary embodiments of the invention, the set of operations performed on a single block can be treated as an atomic unit. Although parallelism within the atomic operation itself can be exploited to some degree, for optimal load balancing across multiple processors, the best way to achieve parallelism is to parallelize the atomic operations across multiple blocks. Each block of data is assumed to depend on a certain causal set of neighborhood blocks. If block A depends on block B, then the atomic operation on block A cannot proceed until the corresponding operation on block B is complete Causality implies that, given the pre-set order for processing the blocks in the multi-dimensional data set, each block can only depend on blocks that precede it in the order of processing.

In the case of image processing, each block of data can represent a rectangular group of pixels and the atomic operation could consist of: (a) some form of causal prediction based on neighborhood blocks, (b) forming a residual data block, and (c) applying a discrete cosine transform on the residual block. Similar situations exist in video where the blocks are three-dimensional and may represent pixels from multiple frames that can be grouped into a cube. In the case of protein folding techniques, the blocks may represent amino acids arranged using a popular lattice model like the hydrophobic-polar (H-P) model. Applications that require such processing may range from video and/or image compression to running queries on multi-dimensional objects in a database.

With reference not to FIG. 1, in the one-dimensional case, it is trivial to show that no parallelization of the atomic operations is possible if each block 102 is dependent on the immediately previous block. This is caused by the fact that the dependencies on adjacent blocks would form a "dependency chain" (illustrated by arrows 104) which prevents any attempt at parallelism. On the other hand, if each block 106 were to only depend on the block before the immediately previous block, as indicated by arrows 108, then two adjacent blocks can be simultaneously processed at a time.

In the case of multi-dimensional data processing, there is more than one order in which blocks may be processed. A popular order is the raster scan order for images, in which each row of blocks in the image is processed from left to right and on completing the row the rows below it are processed one by one in a similar manner. FIG. 2 shows raster scanning of rectangular blocks 202 within a two-dimensional data set 204.

In prior art, instruction-level parallelism is a well-researched topic and describes methods for both on-line and off-line techniques for finding concurrently executable snippets of code. It finds use in optimizing code execution on VLIW (very long instruction word) and SIMD (Single Instruction Multiple Data) architectures. However, it does not solve the problem of optimizing computational performance or load balancing across a cluster of individual processors.

Another well-known method for increasing the speed of processing is to pipeline the sequence of operations applied on each individual data block This method suffers from the problem that the speed of the pipeline is limited by the slowest processing step among the series of steps applied on each block.

U.S. Pat. No. 5,010,515 discloses a parallel graphics processor with workload distributing and dependency mechanisms and method for distributing workload. An interactive 3-dimensional computer graphics display system has an arbitrary number of parallel connected graphic arithmetic processors (GAPS) coupled to an applications processor through a display list management module and coupled to an image memory unit that generates video output. High level commands from the applications processor are distributed for substantially equal temporal processing among the GAPS by delivering the commands to that GAP which is most ready to receive the next command. Each GAP has a FIFO input memory. A plurality of priority levels are established related to GAP FIFO input emptiness. An additional priority scheme is established within each FIFO emptiness level using a daisy-chained grant signal. A command bus includes dedicated lines for control signals between the GAPs to signal the priority and to pass along the grant signal. Sequentiality of the output from the GAPs is maintained by codes included in command headers and monitored by special tag FIFO memories resident on each GAP, which maintain an entry for each sequential command executed by any of the GAPs. The entry indicates that the command is sequential, and whether it is being executed by the GAP upon which the tag FIFO resides. A GAP output controller signals to all other GAPs when it has reached the stage where the next command it will send is a sequential command.

U.S. Pat. No. 6,477,281 discloses an image processing system having multiple processors for performing parallel image data processing. An image processing apparatus is composed of an image memory comprising a plurality of memory elements, and a processor unit comprising a plurality of processor elements. By suitably engineering the arrangement of the image memory of memory elements, the arrangement of the processor unit of processor elements and the connections among the memory elements and processor elements, it is possible to realize, through a simple construction, high-speed image processing such as image density conversion, image color conversion, image masking, image spatial filtering, image enlargement, image reduction, image rotation, image compression, image extension and image color correction. Also provided are an image processing apparatus for a color image, composed of a plurality of image memories and a plurality of processor elements, and a generalized, multifunctional data parallel processing apparatus capable of processing a large volume of data at high speed.

U.S. Pat. No. 5,510,842 discloses a parallel architecture for a high definition television video decoder having multiple independent frame memories. A parallel decoder for an MPEG-2 encoded video signal includes a deformatter which separates the input bit stream into multiple portions, each representing a respectively different section of the HDTV image. The separate portions are processed in parallel by respective decoders. In order to perform motion compensated processing, each of the four decoders includes a memory that holds data represents the entire image. Each decoder provides its decoded output data to all of the decoders to maintain the data in the respective memories.

It would be desirable to overcome the limitations in previous approaches.

SUMMARY OF THE INVENTION

Principles of the present invention provide techniques for parallel processing of multi-dimensional data with causal neighborhood dependencies. In one aspect, an exemplary method (which can be computer implemented) for processing a plurality of adjacent rows of data units, using a plurality of parallel processors, given (i) a predetermined processing order, and (ii) a specified inter-row dependency structure, includes the steps of determining starting times for each individual one of the processors, and maintaining synchronization across the processors, while ensuring that the dependency structure is not violated. Not all the starting times are the same, and a sum of absolute differences between (i) starting times of any given processor and (ii) that one of the processors having an earliest starting time, is minimized.

One particular specific exemplary method for assigning starting times to a plurality of parallel processors processing a plurality of rows of data units includes the step of, within a group of rows having inter-row dependencies, identifying a first given data unit in a first one of the rows in the group. Further, in each of the rows in the group of rows except the first one of the rows, a relative left-most data unit on which the first given data unit is dependent can be identified, to obtain a relative left-most data unit set. Other steps include identifying a relative right-most data unit in the relative left-most data unit set, and identifying a second given data unit in a last one of the rows in the group. Still further, in each of the rows in the group except the last one of the rows, a relative right-most data unit that is dependent on the second given data unit can be identified, to obtain a relative right-most data unit set, and a relative left-most data unit in the relative right-most data unit set can be identified. Another step can include determining the starting times based, at least in part, on the relative right-most data unit in the relative left-most data unit set and the relative left-most data unit in the relative right-most data unit set.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps These and other features, aspects, and advantages of the present invention will become apparent from the following detailed description of illustrative embodiments thereof, which is to be read in connection with the accompanying drawings.

DETAILED DESCRIPTION OF PREFERRED EMBODIMENTS

One or more embodiments of the invention enable one to parallelize the processing of blocks with dependencies in more than one-dimension. Note that in the case of multi-dimensional arrangement of blocks, for certain orderings (including raster-scan ordering), natural breaks in dependency chains occur at the end of each row. Thus, when each block is dependent on its immediately preceding neighbor, assuming raster scan ordering of blocks and a two dimensional data set, such a dependency would still allow for blocks from two different rows to be processed in parallel. One or more embodiments of the invention give a systematic approach to detecting and exploiting parallelism for processing multidimensional data sets when there are dependencies that span multiple rows. Further, one or more embodiments are also applicable to cases where the order of processing may not be raster scan (or its analogues in higher dimensions).

In this exemplary embodiment, the terms "left" and "right" and "top" and "bottom" are employed for purposes of facilitating description in the exemplary context of a raster scan. However, as noted, the invention is not limited to raster scans, and the skilled artisan will appreciate that, for a completely different scan order, it is possible to come up with the equivalent directions, but those may not be actual "left" or "right" etc. For example, if the scan order was right-left instead of left-right, then in the exemplary analysis, we would first find the left-most data unit in the right-most data unit set (on which the current block depends) and the right-most data unit in the left-most data unit set (which depends on the current block). In this instance, absolute right and left are interchanged. Accordingly, the claims refer, for example, to "relative left" and "relative right." Such terminology is intended to cover, respectively, absolute left and right in the case of a conventional raster scan (or other scan where such ordering is appropriate), as well as the converse in the case where absolute right and left are interchanged. Similar principles apply to the concept of top and bottom, and there is no intention to limit the invention to a particular scan order.

Figure 3:
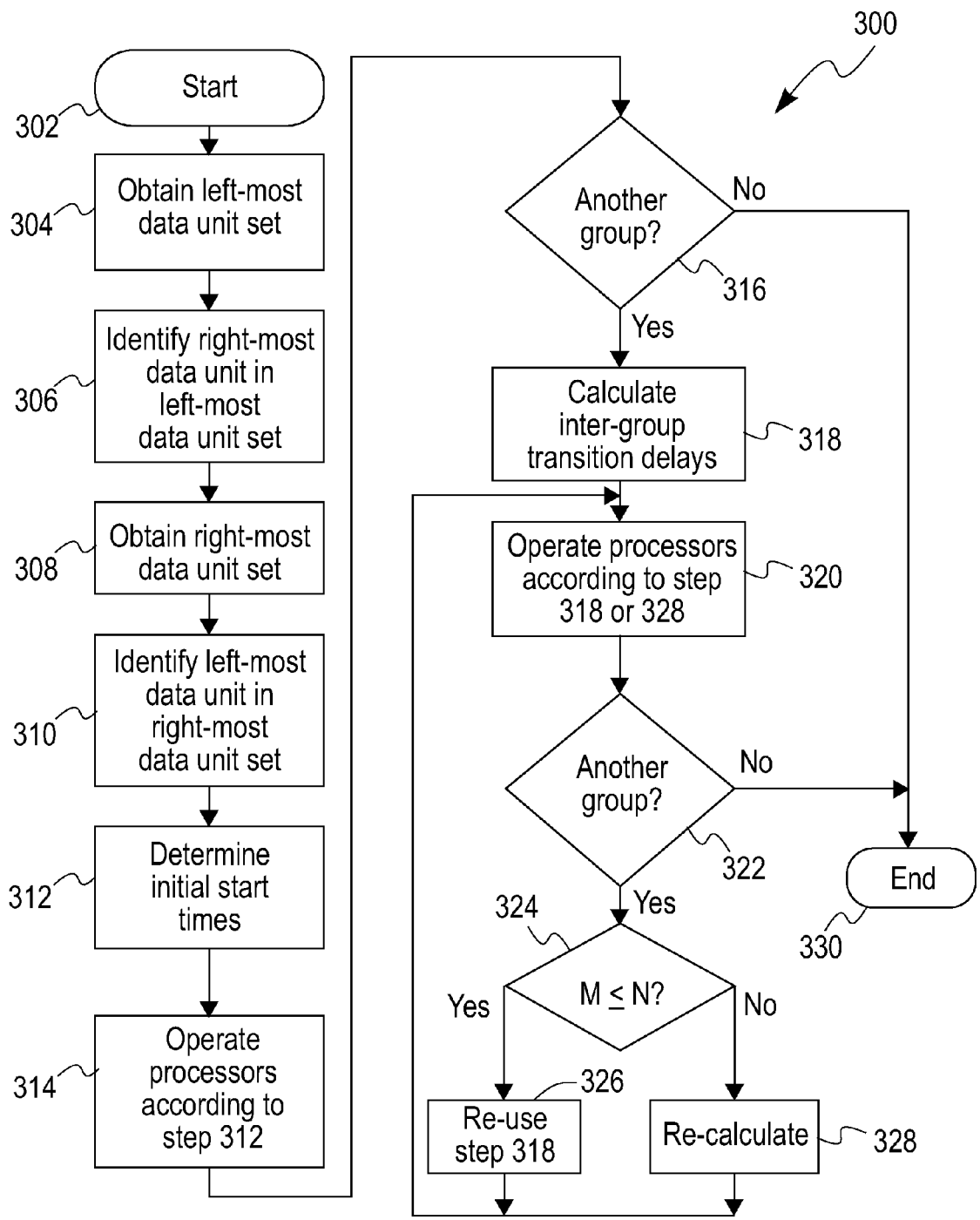
FIG. 3 presents a flow chart of exemplary method steps, according to an aspect of the invention.
Figures 4, 5:
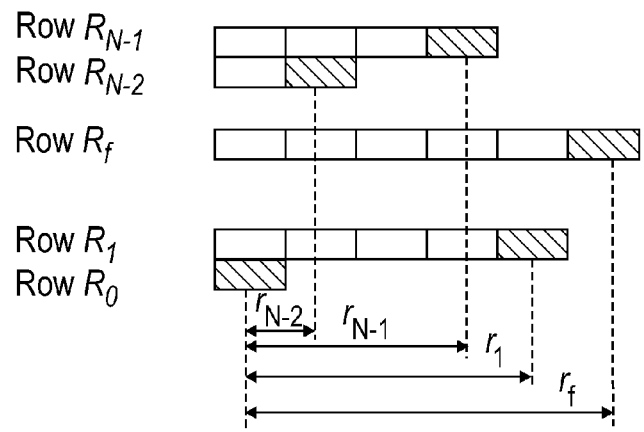
FIG. 4 illustrates exemplary dependence relationships between blocks.
FIG. 5 illustrates exemplary pseudo-code that may be used to assign a set of appropriate starting times.

Attention should now be given to FIG. 3, which shows a flow chart 300 of one exemplary method for assigning starting times to a plurality of parallel processors processing a plurality of rows of data units, according to an aspect of the invention. Note that a "block" is one non-limiting example of a "data unit." After beginning at block 302, within a group of rows having inter-row dependencies, one can identify a first given data unit in a first one of the rows in the group. Note that reference to "one" is not necessarily intended to imply human agency, as one or more embodiments are implemented by software running on a general-purpose computer, or other automated techniques. As at block 304, in each of the rows in the group of rows except the first one of the rows, one can identify a left-most data unit on which the first given data unit is dependent, to obtain a left-most data unit set. Step 2 in the pseudo-code of FIG. 5 shows one manner of accomplishing block 304. As at block 306, one can identify a right-most data unit in the left-most data unit set. Step 3 in the pseudo-code of FIG. 5 shows one manner of accomplishing block 306. An additional step can include identifying a second given data unit in a last one of the rows in the group As at block 308, in each of the rows in the group except the last one of the rows, one can identify a right-most data unit that is dependent on the second given data unit, to obtain a right-most data unit set. Step 5 in the pseudo-code of FIG. 5 shows one manner of accomplishing block 308. As at block 310, one can identify a left-most data unit in the right-most data unit set. Step 6 in the pseudo-code of FIG. 5 shows one manner of accomplishing block 310. Step 312 can include determining the starting times based, at least in part, on the right-most data unit in the left-most data unit set and the left-most data unit in the right-most data unit set. An exemplary formula for determining the start time of an $i^{th}$ processor is presented hereinafter.

As shown at block 314, the processors can then be operated in accordance with the initial start times In many cases, there are N of the processors, the group of rows includes N rows, each with B data units, the group of rows have inter-row dependencies spanning M rows, and there are a plurality of N-row groups. The number of rows are multiples of N; however the dependencies may span only M rows (with M=N, M<N as well as M>N). By "spanning" is meant going across a certain number of rows. Thus, as per decision block 316, one may come to the end of a first group and there may be other groups of rows (if this is not the case, we end at block 330, as per the "NO" branch of block 316). When more groups are present, we can, following the "YES" branch of block 316 to block 318, perform the additional step of computing delays for each of the N processors associated with transitioning from a first of the N-row groups to a second of the N-row groups. As at block 320, the processors can then be operated according to the delays calculated in block 318.

In some instances, the additional step 318 of computing the delays for each of the N processors associated with the transitioning in turn includes, for a first of the N processors to finish processing the first of the N-row groups, determining the delay associated with the transitioning as a maximum of a set of differences between desired and actual processing positions of a remainder of the N processors. This can be done, for example, via Equation 13 below. Further, for each additional one of the N processors, in an order in which they finish the processing of the first of the N-row groups, one can determine the delay associated with the transitioning as a maximum of a set of differences between desired and actual processing positions of a remainder of the N processors, plus the delay associated with a preceding one of the N processors to finish the processing of the first of the N-row groups. This can be done, for example, via Equation 21 below.

As shown at the "NO" branch of decision block 322, if there are no more groups, we are finished. If there are more groups ("YES" branch), a determination can be made (block 324) whether M is less than or equal to N. If this is the case, as per block 326 ("YES" branch of 324), the results from step 318 can be re-used for additional transitions. Thus, when M≦N, an additional step includes employing the delays computed for the transitioning from the first of the N-row groups to the second of the N-row groups for additional transitions between additional ones of the N-row groups. As per block 328, when M>N ("NO" branch of 324), the additional step of re-computing the delays for the transitioning (for additional transitions between additional ones of the N-row groups) can be performed. This is discussed with regard to the second extension below.

It should be noted at this point that we follow the same process for both M=N and M<N, except that for M<N, we set some of the dependency variables $r_i$ to negative infinity (see Extension 1 below). Thus, these two cases can advantageously be grouped together.

In one or more embodiments, when N=M, the step of identifying the left-most data unit on which the first given data unit is dependent, to obtain the left-most data unit set as at 304, involves determining the quantity $P_{R_k}^{min}$ for k=1 to N−1, as per Equation (3) below Furthermore, the step of identifying a right-most data unit in the left-most data unit set as at 306, involves determining a right-most processor as per step 3 in the pseudo-code of FIG. 5. Yet further, the step of identifying a right-most data unit that is dependent on the second given data unit, to obtain a right-most data unit set as at block 308, involves determining the quantity $P_{R_k}^{max}$ for k=N−2 to 0, as per Equation (6) below. Even further, the step of identifying a left-most data unit in the right-most data unit set as at block 310 involves determining a left-most processor as per step 6 in the pseudo-code of FIG. 5.

One or more embodiments involve applying steps 1 and 4 in the pseudo-code of FIG. 5 to perform the steps of setting $P_{R_0}^{min}=P_{R_0}=0$ and setting $P_{R_{N-1}}^{max}=P_{R_{N-1}}=P_{O_0}$. As discussed above, in one or more embodiments, the additional step of computing the delays for each of the N processors associated with the transitioning (block 318) includes calculating an additional wait time for a first of the N processors to finish processing the first of the N-row groups, according to Equation 13 below. Further, for each additional one of the N processors, in an order in which they finish the processing of the first of the N-row groups, one can calculate an additional wait time for each additional one of the processors according to Equation 21 below Given multi-dimensional datasets with dependencies that span multiple rows, one or more embodiments of the invention provide a method for processing several blocks of data in parallel. The method gives the order in which the blocks are to be processed by each of the processors running in parallel and how they should be synchronized to ensure that inter-block dependencies are honored. One significant idea behind this invention is that, given a processing order and the causal dependencies between different blocks being processed, it is possible to process blocks in multiple rows of a multi-dimensional data set in parallel, as long as prescribed synchronization is maintained in processing the blocks. Described herein is a synchronization scheme that is advantageous in minimizing total processing time. By making simplifying assumptions on causal dependencies, and the like, the synchronization scheme can be made simple at the expense of some processing penalty.

Many current applications require the processing of multi-dimensional data sets with arbitrary dependencies among them. Common applications include image and video coding and processing. Typical image coding applications process 2-D data blocks (4×4, 8×8 etc.) serially top to bottom and left to right, and include many different kinds of dependencies. These could include simple neighborhood sets to obtain predictions, such as those used in H.263 motion vector coding, H.264 Intra Prediction, or more complicated neighborhood sets to determine contexts during entropy coding of the blocks. If the time required to process each block is T and there are N rows with B blocks per row, then the total time required with serial processing is NBT.

If instead of processing these blocks serially, we use N encoders in parallel, we can reduce the total processing time by a factor of N. Of course, given the arbitrary dependencies between the blocks in different rows, not all N processors can be started simultaneously, and there is a waiting time overhead when some processors are idle and wait for other processors. In one or more inventive embodiments, we determine this waiting time overhead for such 2-D data processing tasks with arbitrary dependence relationships One or more aspects of the invention also provide a technique that determines the appropriate start times for these processors to minimize the wait time. Often times, the number of rows is so large that we cannot process them all using separate processors Hence, application of embodiments of the invention can be extended to account for the case when we process KN rows using N processors and determine the waiting time overhead for this case.

It will be appreciated that the flow chart of FIG. 3 shows one specific manner of implementing generalized method steps for processing a plurality of adjacent rows of data units, using a plurality of parallel processors, given (i) a predetermined processing order, and (ii) a specified inter-row dependency structure. One generalized method step includes determining starting times for each individual one of the processors. Another generalized method step includes maintaining synchronization across the processors, while ensuring that the dependency structure is not violated. Not all the starting times are the same, and a sum of absolute differences between (i) starting times of any given processor, and (ii) that one of the processors having an earliest starting time, is minimized.

Having described the flow chart of FIG. 3, additional information will now be presented, with regard to FIGS. 4-7. In one aspect, the dependence relationships between the blocks are formalized and analyzed. An analysis is then presented to determine the waiting time overhead for a system with N processors, N rows and B blocks per row Also disclosed is a technique to determine the start times of each of these processors to minimize the waiting time overhead. Techniques for extending the inventive analysis to determine the overhead when processing KN rows of blocks with N processors are set forth, as are further exemplary extensions. An exemplary, non-limiting application is presented and the waiting delay overhead is computed for it.

Note that one or more embodiments provide techniques for simultaneously processing multi-dimensional data arranged in the form of blocks, wherein each block includes one or more atomic elements of the data. The blocks are typically processed in a prescribed sequence The processing of a block typically has to occur after that of one or more blocks that occur before the given block in the given prescribed sequence, such dependencies extending beyond one row of the multidimensional data set. Multiple blocks can be processed simultaneously be different processing elements, the processing being delayed by a preset amount that is either fixed or calculated on the fly to avoid violating the dependency relationships between the blocks identified in the previous step.

Dependence Relationships Between Data Units

Consider a set of 2-D data blocks (units) with N rows numbered 0 to N and B blocks per row, that require processing in a raster scan order (left to right and top to bottom). In addition consider a dependence relationship between these data units as shown in FIG. 4. The dependence relationship between block in row $R_k$ and blocks in row $R_{k+i}$ is defined by the distance $r_i (\leq B)$. This is the distance between (i) the right-most block in $R_{k+i}$ that the current block (in row $R_k$) depends on, and (ii) the current block. It can be assumed that these dependence relationships do not change for blocks in different rows, except for the edge effects, when some rows are unavailable. Note that there is no dependence on blocks in rows below the current row, i.e. blocks in $R_k$ do not depend on blocks in $R_{k-1}$. This is typical in many image and video coding and processing applications.

Dependence Relationships: Bottom to Top Analysis

If block in row $R_0$ at position $P_{R_0}$ needs to be processed, then using these dependence relationships, we can determine which blocks in other rows already need to be processed (as the current block depends on them). Hence, for each of the other rows $R_k$, the minimum (left-most) position $P_{R_k}^{min}$ of the block that already needs to be processed before the block $P_{R_0}$ can be processed may be derived as:

$$P_{R_1}^{min} = P_{R_0} + r_1 \tag{1}$$

$$P_{R_2}^{min} = \max(P_{R_0} + r_2, P_{R_1}^{min} + r_1) \tag{2}$$

$$P_{R_k}^{min} = \max(P_{R_0} + r_k, P_{R_1}^{min} + r_{k-1}, P_{R_2}^{min} + r_{k-2}, \ldots, P_{R_{k-1}}^{min} + r_1) \tag{3}$$

In the above derivation, we account for both primary (blocks on which the current block directly depends) and secondary (block on which the predictors of the current block depend on) dependence relationships. Note that if the derived position is less than zero, the processor may be considered as waiting before starting, and if the position is greater than B, the processor is assumed to have finished the row, and may be waiting or processing another row.

Dependence Relationships: Top to Bottom Analysis

Similarly, each row also has a maximum (right-most) position for the block that can be processed given the positions of processed blocks in rows above it (since blocks in the current row depends on these rows). As before, for each of the rows $R_k$, the maximum (right-most) position $P_{R_k}^{max}$ of the block that can be processed while block $P_{R_{N-1}}$ is being processed in row $R_{N-1}$ may be derived as:

$$P_{R_{N-2}}^{max} = P_{R_{N-1}} - r_1 \tag{4}$$

$$P_{R_{N-3}}^{max} = \min(P_{R_{N-1}} - r_2, P_{R_{N-2}} - r_1) \tag{5}$$

$$P_{R_k}^{max} = \min(P_{R_{N-1}} - r_{N-1-k}, P_{R_{N-2}}^{max} - r_{N-2-k}, \ldots, P_{R_{k+1}}^{max} - r_1) \tag{6}$$

Parallel Processing of Data Units with Minimized Delay

We should account for these dependencies if we want to process the N rows of blocks in a parallel manner using separate processors for each row. If the different processors are started at time instances $T_{O_0}, T_{O_1}, \ldots, T_{O_{N-1}}$ where $O_0$ is the index of the row with the right-most position (processor started first) and $O_{N-1}$ is the index of the row with the left most position (processor started last), the system incurs a waiting time overhead of $T_{O_0} - T_{O_{N-1}}$.

It is to be expected that the system will have the minimum waiting overhead when the right-most processor is operating at its minimum position, and the left most processor is operating at its maximum position. These processors, thus, should be allotted a set of positions $\{P_{R_0}, P_{R_1}, \ldots, P_{R_{N-1}}\}$, with $P_{R_i}^{min} \leq P_{R_i} \leq P_{R_i}^{max}$ such that this waiting time is minimized.

One particular technique, shown as pseudo code, that may be used to assign a set of appropriate starting times is as shown in FIG. 5. Processor i is started at time instant $T_{O_i} = T \times (P_{O_0} - P_{O_i})$, where T is the time required to process one block. The waiting time overhead for this system is $W^0 = T \times (P_{O_0} - P_{O_{N-1}})$.

Delay Analysis: Parallel Processing of Multiple Rows of Data Units

Figure 6:
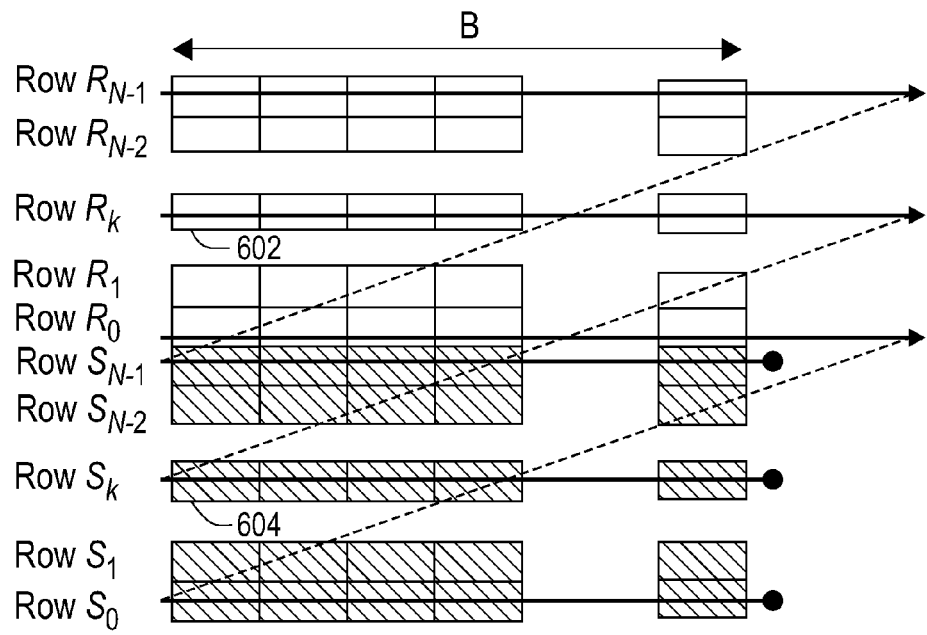
FIG. 6 illustrates exemplary processing of 2N rows using N processors.

We now present exemplary analysis for the same set of N processors with the starting positions $\{P_{R_0}, P_{R_1}, \ldots, P_{R_{N-1}}\}$ that are used to process 2N such rows of blocks, as shown in FIG. 6 Consider the processor $O_0$ that first finishes processing a row $R_k$, numbered as 602. Before it can start processing row $S_k$, numbered as 604, we need to examine dependencies on blocks in rows $S_{k+1}$ through $S_{N-1}$ and rows $R_0$ through $R_{k-1}$. The dependencies on blocks in rows $S_{k+1}$ through $S_{N-1}$ were already considered during the first processing pass, i.e. these processors were already started with the appropriate lags or leads in the first stage. Hence, we now examine dependencies between blocks in row $S_k$ and blocks in rows $R_0$ through $R_{k-1}$. These dependencies, which were previously unexamined, can lead to an additional waiting time $W_{S_k}$ before the processor can start processing row $S_k$. The desired minimum positions of the processors in rows $R_0$ through $R_{k-1}$ (so that the first block in $S_k$ can start being processed) may be determined as:

$$D_{S_k \to R_0} = r_{N-k} \tag{7}$$

$$D_{S_k \to R_1} = r_{N-k+1} \tag{8}$$

$$D_{S_k \to R_{k-1}} = r_{N-1} \tag{9}$$

However, when the processor finishes row $R_k$ and is ready to start row $S_k$ these processors are at actual positions:

$$A_{S_k \to R_0} = \min(B - P_{R_k} + P_{R_0}, B) \tag{10}$$

$$A_{S_k \to R_1} = \min(B - P_{R_k} + P_{R_1}, B) \tag{11}$$

$$A_{S_k \to R_{k-1}} = \min(B - P_{R_k} + P_{k-1}, B) \tag{12}$$

The time that this processor needs to wait for each of the other processors is $\Delta_{S_k \to R_i} = T(D_{S_k \to R_i} - A_{S_k \to R_i})$; $i = 0, \ldots, k-1$ Hence, the additional wait time for this processor is:

$$W_{S_k} = W_{O_0} = \max(\Delta_{S_k \to R_0}, \Delta_{S_k \to R_1}, \ldots, \Delta_{S_k \to R_{k-1}}, 0). \tag{13}$$

Consider the next processor that finishes a row, i.e. processor $O_1$ associated with row $R_j$. Before it can start processing row $S_j$, it needs to wait. It first needs to wait a period of time $W_{O_0}$ to re-establish the position relationships with processor $O_0$ (when a processor's actual position is greater than B it is assumed to have either switched to the next row, or is waiting for some other processor to finish) After that it also needs to consider the dependence relationships on rows $R_0$ through $R_{j-1}$, as described earlier. The desired and actual positions of these processors are:

$$D_{S_j \to R_0} = r_{N-j}; \; A_{S_j \to R_0} = \min(B - P_{R_j} + P_{R_0} + W_{O_0}T, B) \tag{14}$$

$$D_{S_j \to R_1} = r_{N-j+1}; \; A_{S_j \to R_1} = \min(B - P_{R_j} = P_{R_1} + W_{O_0}T, B) \tag{15}$$

$$D_{S_j \to R_{j-1}} = r_{N-1}; \; A_{S_j \to R_{j-1}} = \min(B - P_{R_j} + P_{R_{j-1}} + W_{O_0}T, B) \tag{16}$$

Hence, the additional waiting time for this processor may be written as:

$$W_{S_j} = W_{O_1} = \max(\Delta_{S_j \to R_0}, \Delta_{S_j \to R_1}, \ldots, \Delta_{S_j \to R_{j-1}}, 0) + W_{O_0}, \tag{17}$$

where $\Delta_{S_j \to R_i}$ are as defined earlier.

Proceeding similarly, for any other $O_m$ associated with row $R_i$ we have the desired and actual locations as:

$$D_{S_j \to R_0} = r_{N-1}, \; A_{S_j \to R_0} = \min(B - P_{R_i} + P_{R_0} + W_{O_{m-1}}T, B) \tag{18}$$

$$D_{S_j \to R_1} = r_{N-i+1}, \; A_{S_j \to R_1} = \min(B - P_{R_1} + W_{O_{m-1}}T, B) \tag{19}$$

$$D_{S_j \to R_{i-1}} = r_{N-1}, \; A_{S_j \to R_{i-1}} = \min(B - P_{R_{i-1}} + W_{O_{m-1}}T, B) \tag{20}$$

and the wait time:

$$W_{S_i} = W_{O_m} = \max(\Delta_{S_j \to R_0}, \Delta_{S_j \to R_1}, \ldots, \Delta_{S_j \to R_{i-1}}, 0) + W_{O_{m-1}} \tag{21}$$

Since wait time for each processor includes the wait time for all processors that switched before it, the additional waiting time for this system of N processors when the second N rows of blocks are processed is $W^1 = W_{O_{N-1}}$. Hence, the total waiting time for this system of processors is $W^0 + W^1$. Finally, the total waiting time overhead for a system with KN rows and N processors is:

$$(K-1)W^1 + W^0 \tag{22}$$

Exemplary Extensions to Inventive Techniques

In the exemplary techniques above, we have derived the results for the case when the dependence relationships extend to exactly N rows, which is the same as the number of processors used. In general this may not be true, and we can have dependencies extending across M ($\neq$N) rows. There are two separate cases that may advantageously be examined:

1) M<N: In this first exemplary extension case, we have more processors than the rows to which the dependencies extend Rows on which the current block does not depend on can be accounted for in the above-presented derivation. If blocks in row $R_k$ do not depend on blocks in row $R_{k+i}$, we can set $r_i = -\infty$ to capture this. The rest of the analysis follows as set forth above.

Figure 1:
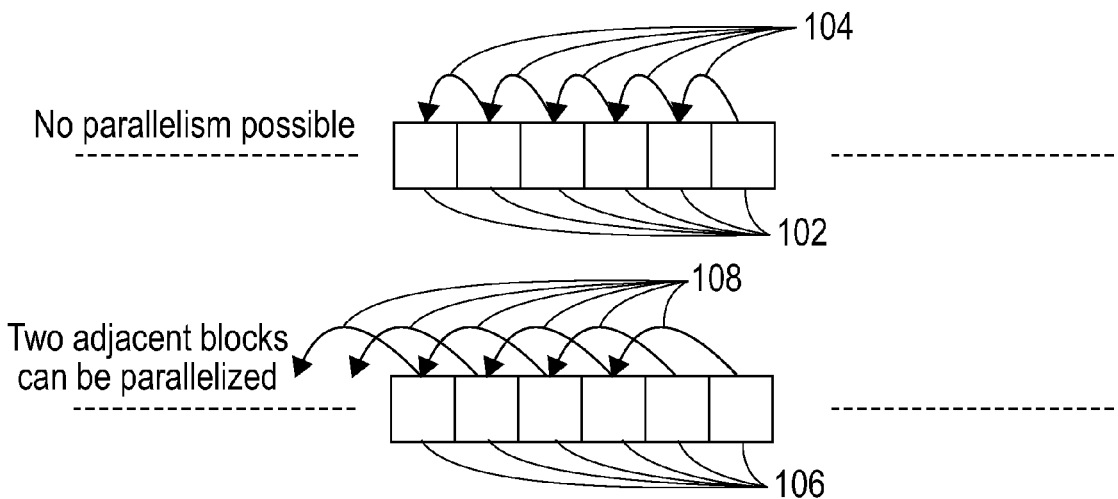
FIG. 1 illustrates two cases for parallelism with one-dimensional data dependencies, known in the prior art.
Figure 2:
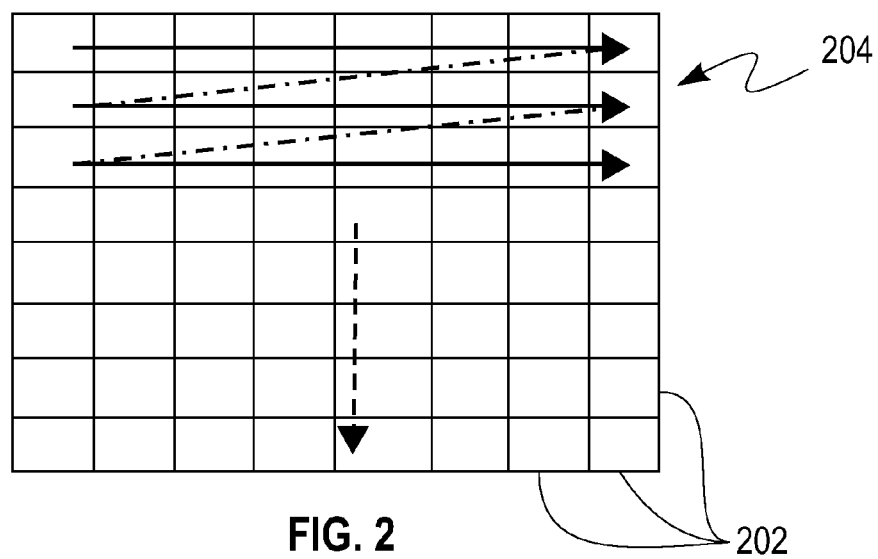
FIG. 2 illustrates a raster scan order of blocks in a two-dimensional data set, known in the prior art.

Referring back to FIG. 1, in this first exemplary extension case, with M<N, the step 304 of identifying the left-most data unit on which the first given data unit is dependent, to obtain the left-most data unit set, includes determining the quantity $P_{R_k}^{min}$ for k=1 to N−1:

$$P_{R_k}^{min} = \max(P_{R_0} + r_k, P_{R_1}^{min} + r_{k-1}, P_{R_2}^{min} + r_{k-2}, \ldots, P_{R_{k-1}}^{min} + r_1) \tag{23}$$

wherein:

$P_{subscript1}$ is a position of a given data unit in a row corresponding to subscript1; and $r_{subscript2}$ is a distance between (i) a right-most data unit in an adjacent row that a current data unit in row subscript2 depends on, and (ii) the current data unit. $r_{subscript2}$ is set to negative infinity when data units in a row corresponding to subscript2 do not depend on data units in an adjacent row Further, the step 306 of identifying a right-most data unit in the left-most data unit set includes determining a right-most processor $$O_0 = \underset{j=0,1,\ldots,N-1}{\operatorname{argmax}} \left(P_{R_j}^{min}\right)$$

and setting $$P_{O_0} = \max_{j=0,1,\ldots,N-1} \left(P_{R_j}^{min}\right)$$

Yet further, the step 308 of identifying a right-most data unit that is dependent on the second given data unit, to obtain a right-most data unit set, includes determining the quantity of $P_{R_k}^{max}$ for k=N−2 to 0:

$$P_{R_k}^{max} = \min(P_{R_{N-1}} - r_{N-1-k}, P_{R_{N-2}}^{max} - r_{N-2-k}, \ldots, P_{R_{k+1}}^{max} - r_1). \tag{24}$$

Even further, the step of identifying a left-most data unit in the right-most data unit set involves determining a left-most processor $$O_{N-1} = \underset{j=0,1,\ldots,N-1}{\operatorname{argmin}} \left(P_{R_j}^{max}\right)$$

2) M>N: In this second exemplary extension case, we have fewer processors than the number of rows to which the dependencies extend. The analysis for $W^0$ does not change as only the first N rows have to be considered. However, unlike the derived $W^1$ that remains the same for all subsequent sets of N rows, the wait time can be different for different sets of N rows that are being processed. This is because, although the relative positions of the processors do not change, the number of rows available above the current row can change, thereby leading to different number of dependencies that should be considered Hence, for the second set of N rows that need to be processed, we should, in this exemplary case, compute $D_{S_i \to R_j}$ and $A_{S_i \to R_j}$ for all rows $R_j$ with indices $0 \leq j \leq C$ where:

$$C = \begin{cases} (i + M - 1) \bmod N; & i + M - 1 < 2N \\ N - 1; & \text{otherwise} \end{cases}.$$

This number C changes again when the next set of N rows needs to be processed. Let $$D = \left\lfloor \frac{M}{N} \right\rfloor$$

where $\lfloor \ \rfloor$ represents the floor operation. Until the $D+1^{th}$ set of N rows, this number C changes, leading to different waiting time overheads that should be computed.

EXAMPLE

Figure 7:
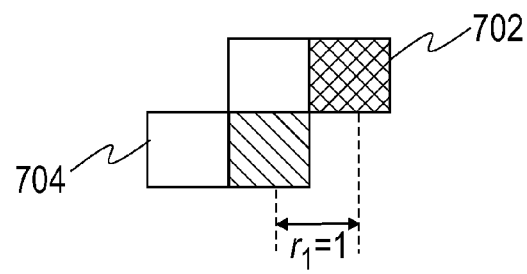
FIG. 7 shows an exemplary dependence relationship in motion vector coding.

Consider the non-limiting example of differential coding of motion vectors in H.263, where neighboring motion vectors are used to predict the current motion vector using a structure shown in FIG. 7. The dependencies between blocks extend to only one row 702 above the current row 704, with a maximum distance $r_1=1$. Consider a QCIF (quarter common intermediate format) (176×144) size frame with (16×16) size blocks, i.e. B=11. If we use one processor, the total time to process the frame is 99T. Instead, if we use N=3 processors, then these have start locations $P_{R_0}=0$, $P_{R_1}=1$ and $P_{R_2}=2$, and the waiting time overhead is $W^0=2T$. For each additional set of 3 rows that need to be processed the wait time $W^1=0$, since B>2. The total time to process this frame using three processors is 33T+2T.

Exemplary System and Article of Manufacture Details

A variety of techniques, utilizing dedicated hardware, general purpose processors, firmware, software, or a combination of the forgoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 8:
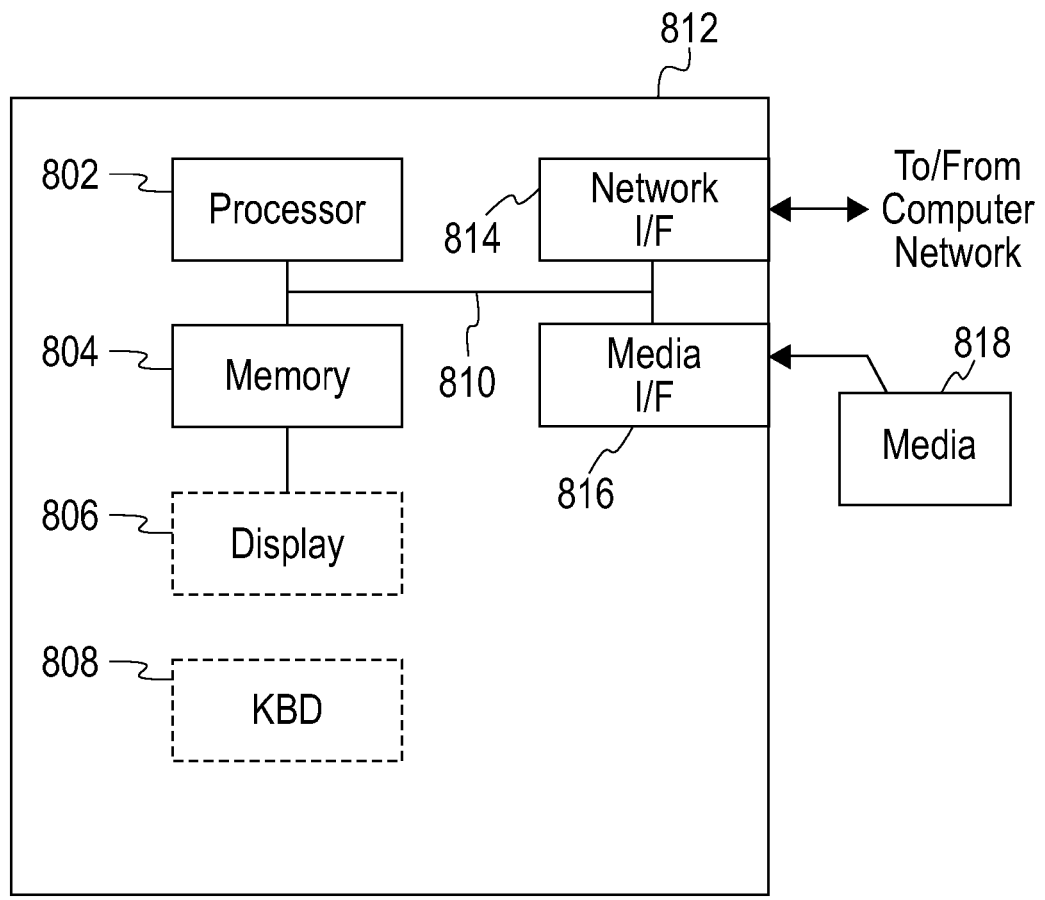
FIG. 8 depicts a computer system that may be useful in implementing one or more aspects and/or elements of the present invention.

One or more embodiments can make use of software running on a general purpose computer or workstation With reference to FIG. 8, such an implementation might employ, for example, a processor 802, a memory 804, and an input/output interface formed, for example, buy a display 806 and a keyboard 808. The term "processor" as used herein is intended to include any processing device, such as, for example, one that includes a CPU (central processing unit) and/or other forms of processing circuitry. Further, the term "processor" may refer to more than one individual processor.

The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 818) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 804), magnetic tape, a removable computer diskette (for example media 818), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for assigning starting times to a plurality of parallel processors processing a plurality of rows of data units, each of said plurality of parallel processors processing one or more of said rows of data units, said method comprising the steps of:
    within a group of rows having inter-row dependencies, identifying a first given data unit in a first one of said rows in said group;
    in each of said rows in said group of rows except said first one of said rows, identifying a relative left-most data unit on which said first given data unit is dependent, to obtain a relative left-most data unit set;
    identifying a relative right-most data unit in said relative left-most data unit set;
    identifying a second given data unit in a last one of said rows in said group;
    in each of said rows in said group except said last one of said rows, identifying a relative right-most data unit that is dependent on said second given data unit, to obtain a relative right-most data unit set;
    identifying a relative left-most data unit in said relative right-most data unit set; and
    determining said starting times based, at least in part, on said relative right-most data unit in said relative left-most data unit set and said relative left-most data unit in said relative right-most data unit set.

2. The method of claim 1, wherein:
    there are N of said processors;
    said group of rows comprises N rows, each with B data units;
    said group of rows have inter-row dependencies spanning M rows; and
    there are a plurality of N-row groups;
    further comprising the additional step of computing delays for each of said N processors associated with transitioning from a first of said N-row groups to a second of said N-row groups.

3. The method of claim 2, wherein said additional step of computing said delays for each of said N processors associated with said transitioning in turn comprises:
    for a first of said N processors to finish processing said first of said N-row groups, determining said delay associated with said transitioning as a maximum of a set of differences between desired and actual processing positions of a remainder of said N processors;
    for each additional one of said N processors, in an order in which they finish said processing of said first of said N-row groups, determining said delay associated with said transitioning as a maximum of a set of differences between desired and actual processing positions of a remainder of said N processors, plus said delay associated with a preceding one of said N processors to finish said processing of said first of said N-row groups.

4. The method of claim 3, wherein $M \leq N$, further comprising the additional step of employing said delays computed for said transitioning from said first of said N-row groups to said second of said N-row groups for additional transitions between additional ones of said N-row groups.

5. The method of claim 3, wherein $M > N$, further comprising the additional step of re-computing said delays for said transitioning for additional transitions between additional ones of said N-row groups.

6. The method of claim 2, further comprising the additional step of operating said N processors in accordance with said starting times and said delays associated with said transitioning.

7. The method of claim 2, wherein:
    N=M;
    said step of identifying said relative left-most data unit on which said first given data unit is dependent, to obtain said relative left-most data unit set, comprises determining the quantity $$P_{R_k}^{min} \text{ for } k = 1 \text{ to } N-1: P_{R_k}^{min} = \max(P_{R_0} + r_k, P_{R_1}^{min} + r_{k-1}, P_{R_2}^{min} + r_{k-2}, K, P_{R_{k-1}}^{min} + r_1)$$

wherein:
    $P_{subscript1}$ comprises a position of a given data unit in a row corresponding to subscript1; and
    $r_{subscript2}$ comprises a distance between a relative right-most data unit in an adjacent row that a current data unit in row subscript2 depends on, and said current data unit;
said step of identifying a relative right-most data unit in said relative left-most data unit set comprises determining a relative right-most processor $$O_0 = \underset{j=0,1,K,N-1}{\operatorname{argmax}} \left( P_{R_j}^{min} \right)$$

and setting $$P_{O_0} = \max_{j=0,1,K,N-1} \left( P_{R_j}^{min} \right);$$

said step of identifying a relative right-most data unit that is dependent on said second given data unit, to obtain a relative right-most data unit set, comprises determining the quantity $$P_{R_k}^{max} \text{ for } k = N-2 \text{ to } 0:$$
$$P_{R_k}^{max} = \min(P_{R_{N-1}} - r_{N-1-k}, P_{R_{N-2}}^{max} - r_{N-2-k}, K, P_{R_{k+1}}^{max} - r_1); \text{ and}$$

said step of identifying a relative left-most data unit in said relative right-most data unit set comprises determining a relative left-most processor $$O_{N-1} = \underset{j=0,1,K,N-1}{\operatorname{argmin}} \left(P_{R_j}^{max}\right).$$

8. The method of claim 7, wherein said step of determining said starting times comprises applying, for each processor:

$$T_{O_i} = T \times (P_{O_0} - P_{O_i})$$

wherein:
T=time required to process one data unit.

9. The method of claim 7, further comprising the additional steps of:

setting $P_{R_0}^{min} = P_{R_0} = 0$; and setting $P_{R_{N-1}}^{max} = P_{R_{N-1}} = P_{O_0}$.

10. The method of claim 2, wherein:
M<N;
said step of identifying said relative left-most data unit on which said first given data unit is dependent, to obtain said relative left-most data unit set, comprises determining the quantity $P_{R_k}^{min}$ for $k = 1$ to $N-1$:

$$P_{R_k}^{min} = \max\left(P_{R_0} + r_k, P_{R_1}^{min} + r_{k-1}, P_{R_2}^{min} + r_{k-2}, K, P_{R_{k-1}}^{min} + r_1\right)$$

wherein:
$P_{subscript1}$ comprises a position of a given data unit in a row corresponding to subscript1; and
$r_{subscript2}$ comprises a distance between a relative right-most data unit in an adjacent row that a current data unit in row subscript2 depends on, and said current data unit, $r_{subscript2}$ being set to negative infinity when data units in a row corresponding to subscript2 do not depend on data units in an adjacent row;
said step of identifying a relative right-most data unit in said relative left-most data unit set comprises determining a relative right-most processor $$O_0 = \underset{j=0,1,K,N-1}{\operatorname{argmax}} \left(P_{R_j}^{min}\right)$$

and setting $$P_{O_0} = \underset{j=0,1,K,N-1}{\max} \left(P_{R_j}^{min}\right);$$

said step of identifying a relative right-most data unit that is dependent on said second given data unit, to obtain a relative right-most data unit set, comprises determining the quantity $P_{R_k}^{max}$ for $k = N-2$ to $0$:

$$P_{R_k}^{max} = \min\left(P_{R_{N-1}} - r_{N-1-k}, P_{R_{N-2}}^{max} - r_{N-2-k}, K, P_{R_{k+1}}^{max} - r_1\right);$$

and said step of identifying a relative left-most data unit in said relative right-most data unit set comprises determining a relative left-most processor $$O_{N-1} = \underset{j=0,1,K,N-1}{\operatorname{argmin}} \left(P_{R_j}^{max}\right).$$

11. The method of claim 2, wherein said additional step of computing said delays for each of said N processors associated with said transitioning in turn comprises:
calculating an additional wait time for a first of said N processors to finish processing said first of said N-row groups, according to:

$$W_{S_k} = W_{O_0} = \max(\Delta_{S_k \circledR R_0}, \Delta_{S_k \circledR R_1}, K, \Delta_{S_k \circledR R_{k-1}}, 0),$$

wherein:
$A_{S_k \circledR R_{k-1}} = \min(B - P_{R_k} + P_{R_{k-1}}, B)$;
B=number of data elements per row;
$D_{S_k \circledR R_{k-1}} = r_{N-1}$; and
$\Delta_{S_k \circledR R_i} = T(D_{S_k \circledR R_i} - A_{S_k \circledR R_i})$, for i=0, K, k−1; and
for each additional one of said N processors, in an order in which they finish said processing of said first of said N-row groups, calculating an additional wait time for each additional one of said processors according to:

$$W_{S_i} = W_{O_m} = \max(\Delta_{S_i \circledR R_0}, \Delta_{S_i \circledR R_1}, K, \Delta_{S_i \circledR R_{k-1}}, 0) + W_{O_{m-1}} m,$$

wherein:
$A_{S_i \circledR R_{i-1}} = \min(B - P_{R_i} + P_{R_{i-1}} + W_{O_{m-1}} T, B)$;
T=time required to process one data unit;
$D_{S_i \circledR R_{i-1}} = r_{N-1}$; and
$\Delta_{S_i \circledR R_i} = T(D_{S_k \circledR R_i} - A_{S_k \circledR R_i})$, for i=0, K, k−1.

12. The method of claim 1, wherein said step of determining starting times ensures that said inter-row dependencies are not violated; and
wherein:
not all said starting times are the same; and
a sum of absolute differences between (i) starting times of any given processor, and (ii) that one of said processors having an earliest starting time, is minimized.

13. A computer program product comprising a computer useable medium including computer usable program code, when executed, for assigning starting times to a plurality of parallel processors processing a plurality of rows of data units, each of said plurality of parallel processors processing one or more of said rows of data units, said computer program product including:
computer usable program code for, within a group of rows having inter-row dependencies, identifying a first given data unit in a first one of said rows in said group;
computer usable program code for, in each of said rows in said group of rows except said first one of said rows, identifying a relative left-most data unit on which said first given data unit is dependent, to obtain a relative left-most data unit set;
computer usable program code for identifying a relative right-most data unit in said relative left-most data unit set;
computer usable program code for identifying a second given data unit in a last one of said rows in said group;
computer usable program code for, in each of said rows in said group except said last one of said rows, identifying a relative right-most data unit that is dependent on said second given data unit, to obtain a relative right-most data unit set;
computer usable program code for identifying a relative left-most data unit in said relative right-most data unit set; and
computer usable program code for determining said starting times based, at least in part, on said relative right-most data unit in said relative left-most data unit set and said relative left-most data unit in said relative right-most data unit set.

14. The computer program product of claim 13, wherein:
there are N of said processors;
said group of rows comprises N rows, each with B data units; and
said group of rows having inter-row dependencies spanning M rows; and
there are a plurality of N-row groups;
further comprising computer usable program code for computing delays for each of said N processors associated with transitioning from a first of said N-row groups to a second of said N-row groups.

15. The computer program product of claim 14, wherein said computer usable program code for computing said delays for each of said N processors associated with said transitioning in turn comprises:
computer usable program code for, for a first of said N processors to finish processing said first of said N-row groups, determining said delay associated with said transitioning as a maximum of a set of differences between desired and actual processing positions of a remainder of said N processors;
computer usable program code for, for each additional one of said N processors, in an order in which they finish said processing of said first of said N-row groups, determining said delay associated with said transitioning as a maximum of a set of differences between desired and actual processing positions of a remainder of said N processors, plus said delay associated with a preceding one of said N processors to finish said processing of said first of said N-row groups.

16. The computer program product of claim 15, wherein N=M, further comprising computer usable program code for employing said delays computed for said transitioning from said first of said N-row groups to said second of said N-row groups for additional transitions between additional ones of said N-row groups.

17. The computer program product of claim 15, wherein M>N, further comprising computer usable program code for re-computing said delays for said transitioning for additional transitions between additional ones of said N-row groups.

18. The computer program product of claim 14, further comprising computer usable program code for operating said N processors in accordance with said starting times and said delays associated with said transitioning.

19. The computer program product of claim 14, wherein: N=M;
said computer usable program code for identifying said relative left-most data unit on which said first given data unit is dependent, to obtain said relative left-most data unit set, comprises computer usable program code for determining the quantity $P_{R_k}^{min}$ for $k = 1$ to $N - 1$:
$$P_{R_k}^{min} = \max(P_{R_0} + r_k, P_{R_1}^{min} + r_{k-1}, P_{R_2}^{min} + r_{k-2}, K, P_{R_{k-1}}^{min} + r_1)$$

wherein:
$P_{subscript1}$ comprises a position of a given data unit in a row corresponding to subscript1; and
$r_{subscript2}$ comprises a distance between a relative right-most data unit in an adjacent row that a current data unit in row subscript2 depends on, and said current data unit;
said computer usable program code for identifying a relative right-most data unit in said relative left-most data unit set comprises computer usable program code for determining a relative right-most processor $$O_0 = \operatorname*{argmax}_{j=0,1,K,N-1} \left( P_{R_j}^{min} \right)$$

and setting $$P_{O_0} = \max_{j=0,1,K,N-1} \left( P_{R_j}^{min} \right);$$

said computer usable program code for identifying a relative right-most data unit that is dependent on said second given data unit, to obtain a relative right-most data unit set, comprises computer usable program code for determining the quantity $P_{R_k}^{max}$ for $k = N - 2$ to $0$:
$$P_{R_k}^{max} = \min(P_{R_{N-1}} - r_{N-1-k}, P_{R_{N-2}}^{max} - r_{N-2-k}, K, P_{R_{k+1}}^{max} - r_1);$$
and said computer usable program code for identifying a relative left-most data unit in said relative right-most data unit set comprises computer usable program code for determining a relative left-most processor $$O_{N-1} = \operatorname*{argmin}_{j=0,1,K,N-1} \left( P_{R_j}^{max} \right).$$

20. The computer program product of claim 13, wherein said computer usable program code for determining starting times ensures that said inter-row dependencies are dependency structure is not violated; and wherein:
not all said starting times are the same; and
a sum of absolute differences between (i) starting times of any given processor, and (ii) that one of said processors having an earliest starting time, is minimized.

* * * * *